United States Patent
Hibbert et al.

(10) Patent No.: US 7,748,346 B2
(45) Date of Patent: Jul. 6, 2010

(54) CAGE DISPENSER FOR MEASURING FOOD INTAKE IN LABORATORY RODENTS

(75) Inventors: Jacqueline Hibbert, Stockbridge, GA (US); Phouyong Sayavongsa, Suwanee, GA (US)

(73) Assignee: Morehouse School of Medicine, Atlanta, GA (US)

( * ) Notice: Subject to any disclaimer, the term of this patent is extended or adjusted under 35 U.S.C. 154(b) by 0 days.

(21) Appl. No.: 11/197,449

(22) Filed: Aug. 5, 2005

(65) Prior Publication Data
US 2007/0028845 A1 Feb. 8, 2007

(51) Int. Cl.
*A01K 5/01* (2006.01)
(52) U.S. Cl. .............. 119/61.51; 119/417; 119/475
(58) Field of Classification Search ............ 119/417, 119/418, 419, 464, 465, 475, 477, 456, 51.01, 119/57.8, 54, 55, 52.1, 61.51
See application file for complete search history.

(56) References Cited
U.S. PATENT DOCUMENTS

| 3,575,141 | A | * | 4/1971 | Elkins | 119/55 |
|---|---|---|---|---|---|
| 3,965,868 | A | * | 6/1976 | Hunziker, Jr. | 119/52.4 |
| 4,215,650 | A | * | 8/1980 | Campbell | 119/417 |
| 5,499,609 | A | * | 3/1996 | Evans et al. | 119/61.51 |
| 6,234,111 | B1 | * | 5/2001 | Ulman et al. | 119/54 |
| 6,691,644 | B1 | * | 2/2004 | Anderson | 119/502 |

OTHER PUBLICATIONS

International Search Report, International Preliminary Report on Patentability and the Written Opinion of the International Search Authority for PCT/US2006/030147.

* cited by examiner

*Primary Examiner*—T. Nguyen
(74) *Attorney, Agent, or Firm*—Ping Wang; Morris Manning & Martin, LLP

(57) ABSTRACT

A feeding chamber is reached by an ascending ramp and an entrance passage, the top of said feeding chamber being defined by a first grid through which feed descends into said feeding chamber and the floor of said feeding chamber being defined by a second grid which allows food to fall from within said feeding chamber into a spillage chamber.

9 Claims, 3 Drawing Sheets

CAGE DISPENSER FOR MEASURING FOOD INTAKE IN LABORATORY RODENTS

FIELD AND BACKGROUND OF THE INVENTION

This device relates to use of dispensers for studies requiring careful measurement of intake by animals. Many studies such as those investigating meal pattern, calorie intake, diet restriction and resultant metabolism require food intake measurements. In the case of animal models, food intake can be measured with varying levels of accuracy and sophistication and twenty-four hour intake is generally considered to be a good time period. For mouse models, for example, intake is often measured using group cages yielding an estimate of average intake per mouse as a gross measure that can provide meaningful information for some purposes. In many cases, twenty-four hour intake may simply be measured as the weight difference between food put into the cage and food remaining at the end of the 24-hour period. However, the accuracy of this method is limited by inability to account for gnaw waste, which is often a significant proportion of the difference between pre- and post- food weights, since the waste may fall on the bottom of the cage. Moreover, mice will often remove small pellets from a food hopper (food bin) and deposit them inside the cage where they combine with bedding, urine and feces. This food often can not be retrieved and isolated for measurement. Use of ground chow will prevent hoarding of food, but increases spillage. Combining the ground chow with water can reduce spillage but this changes the texture and palatability of the diet, which may induce altered food intake.

There are a number of systems available for tracking food intake in rodents. The simplest computer-based system employs a photocell, providing information about the feeding pattern but no quantitative consumption data. Other systems that provide both quantitative and feeding pattern data are quite expensive and difficult to maintain. Pellet dispensers that are less expensive are available with a variety of options. Traditional lever press systems serve mainly as measures of food motivation. More recent pellet systems linking food hoppers with infrared detectors provide mostly information about meal patterns with limited quantification of food intake. A major disadvantage many of these systems is clogging due to crumb accumulation. Therefore, the equipment must be frequently checked and cleaned. Pellet dispensers also limit the variety of diets that can be investigated and each pellet dispenser can generally deliver only one pellet size.

SUMMARY OF THE INVENTION

The invention provides a feed dispenser having a feeding chamber reached by an ascending ramp and an entrance passage, the top of said feeding chamber being defined by a first grid through which feed descends into said feeding chamber and the floor of said feeding chamber being defined by a second grid which allows food to fall from within said feeding chamber into a spillage chamber. The ramp is positioned in such a manner that the animal must ascend the ramp and may, depending on the particular design, have to rise up on the back legs to get into the entry passage. The food supply is controlled when delivered through the angled food retainer grid. Food which is dropped during eating falls through a second grid in the feeding chamber into a collecting chamber. In the preferred embodiment, the grids are installed in the feeder through slit openings in the feeder chambers.

DETAILED DESCRIPTION OF THE INVENTION

The invention disclosed herein is a feeding device designed to accurately quantify food intake by preventing the animal from hoarding food or spilling food during meals. The design of the device results in complete separation of food from urine, feces and bedding. The feeding device can be mounted to any kind of cage by a mounting means and is relatively inexpensive. The design was developed because of unsuccessful attempts using commonly marketed devices, which allowed spillage of food and hoarding of food in such a manner that it could not be separated from urine, feces and bedding materials.

Materials and Methods

Figure 1:
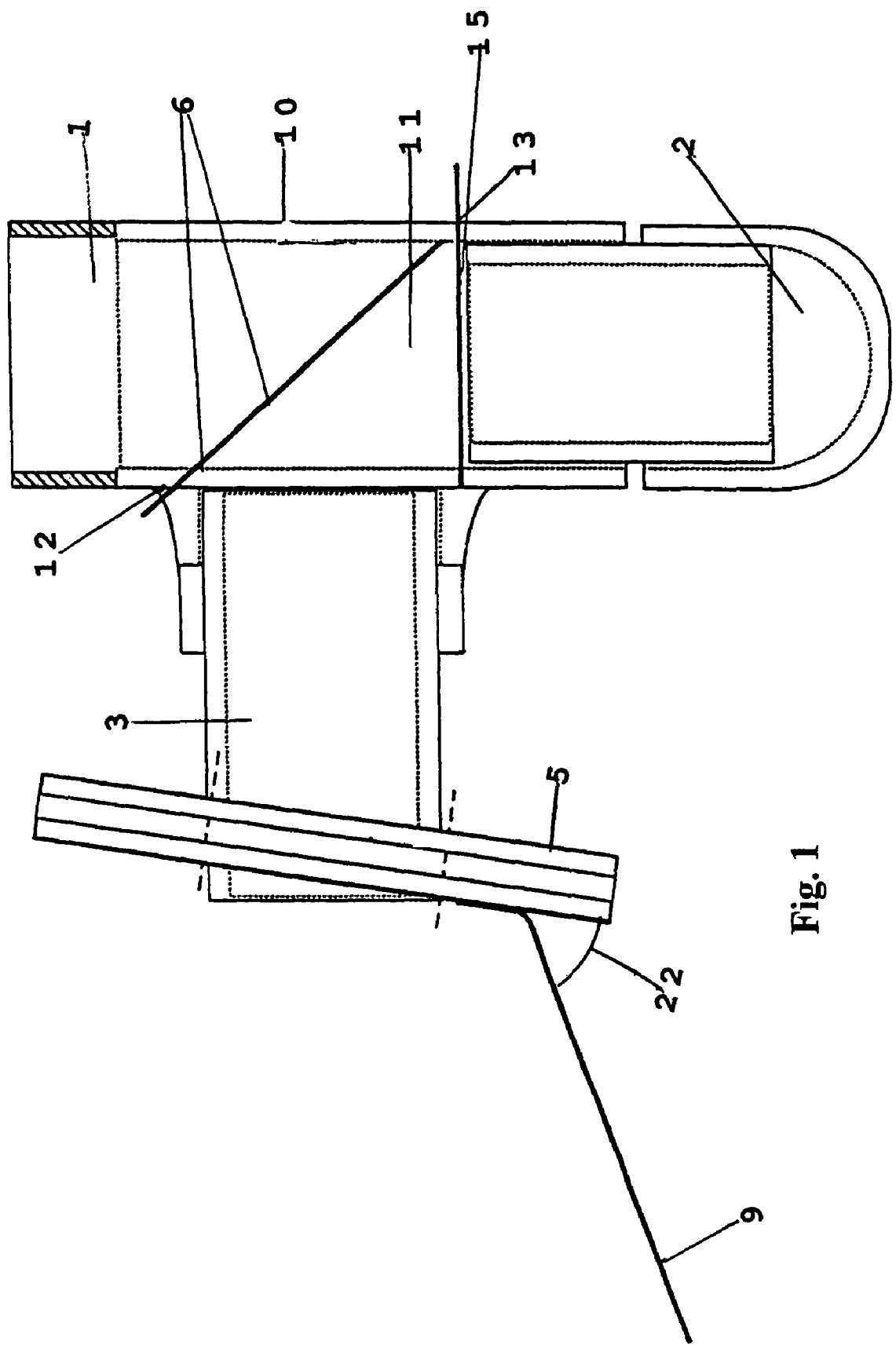
FIG. 1 shows a lateral view of a preferred embodiment of the dispenser.

In a preferred embodiment, the body of the dispenser assembly was constructed of clear polyvinyl chloride (PVC) to enable easy monitoring of activities in the feeding chamber. Referring to FIG. 1, the feeding assembly (10) was mounted on the cage by a connecting collar (5). The animal entry tube or passage (3) leads to the feeding chamber (11) where the food is accessible to the animal. The food holding chamber (1) dispenses food against an angled food retainer grid 6, which elevates the food within the feeding chamber (11), is positioned in the feeding chamber through a first slit (12) in the side of the feeding chamber. Hence, the gird is easily removable from the feeding chamber for cleaning. This grid prevents the animals from removing pellets to a favorite nesting area within the cage. The floor (15) of feeding chamber (11) consists of a grid that is positioned in the assembly through a slit (13) in the wall of the feeding assembly, providing a removable grid which allows food residue to be released into a catchment chamber (2) as spillage, which can then be weighed. (Both grids were made of aluminum. However, any easily cleaned material may be used.) The placement of the components of the dispenser allows the animals to eat only from within chamber (11) without urine or fecal contamination and provides for collection of all food residue in catchment chamber (2). A ramp (9) provides a means of reaching the entrance passage or tube. The angle (22) between the vertical face of the collar (5) and the inferior surface of the ramp (9) is from 10 to 80 degrees, preferably 30-60 degrees. It is possible to have an essentially vertical rise from the slanted portion of the ramp to the feeding chamber that requires the animal to jump or rise up on its hind legs in order to enter the feeding passage. However, such a rise is usually not required.

Figure 5:
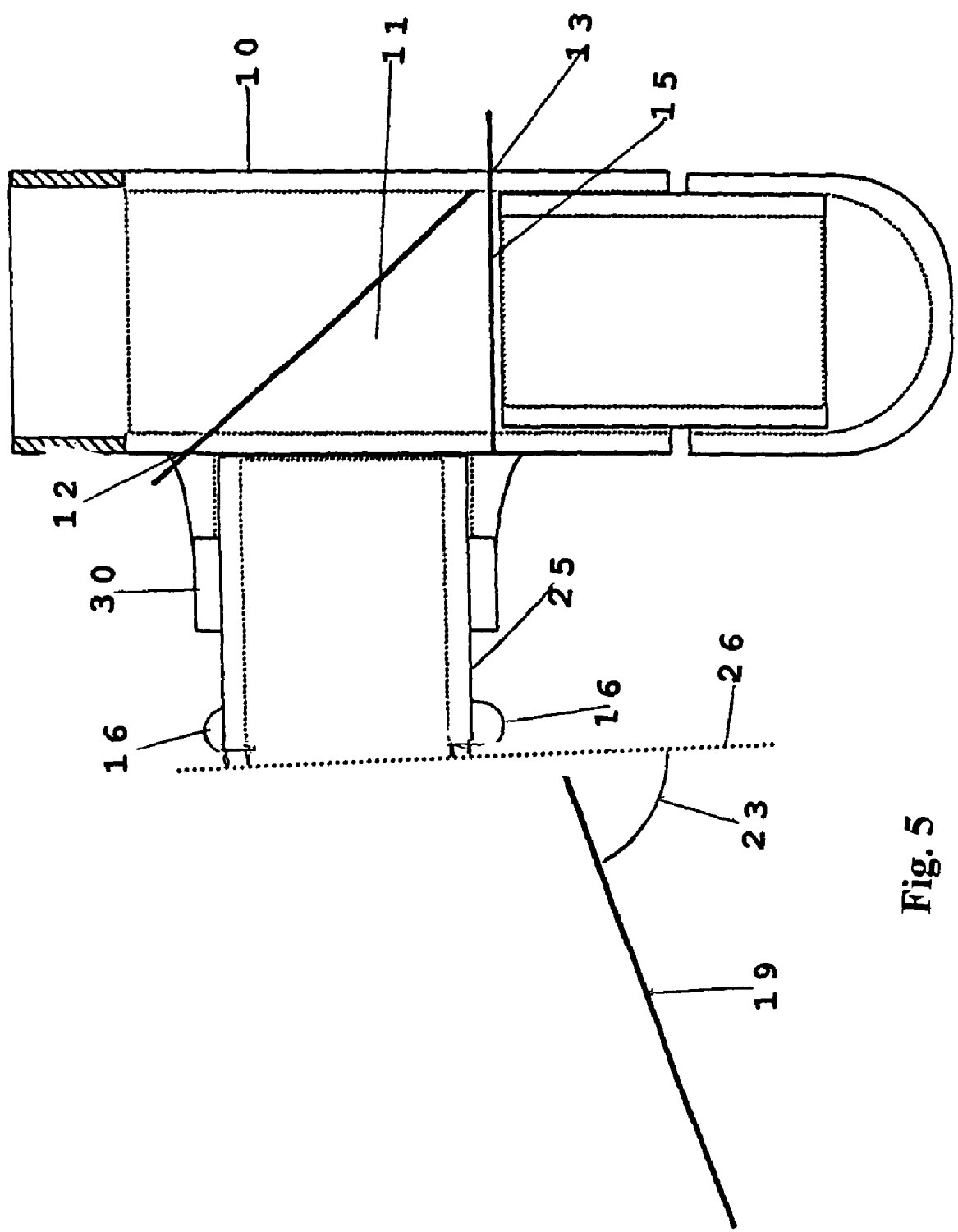
FIG. 5 shows a lateral view of the dispenser.

While a collar (5) to which the ramp was attached was used as a means of attaching the feeding assembly to the cage, clamps, screw-on panels and such known to those in the art may be used as connection means (See FIG. 5, 16). The ramp may be an integral part of the wall of the cage or may be a part of an extension from the entrance passage (3) or, as in FIG. 1, may be part of a collar used as a connecting means. The entrance passage can be of any shape used in making such devices.

A more general view of the dispenser is seen at FIG. 5, which shows attachment means (16) for attaching the feeding assembly (10) to a cage. The ramp (19) is attached to the passage floor (25) or may, in fact, be formed as an extension of the floor of the feeding passage. The angle (23) between the inferior surface of the ramp and an (imaginary) vertical line (26) running approximately perpendicular to the floor (25) of the dispenser can be from 10 to 80 degrees. However, an angle of about 30 to 60 degrees is preferred. Attachment means (16) can be any usual means known in the art such as clamps, screws or clips.

The shape of the walls of the passage and food chambers (1) (2) and (11) and the feeding passage (3) may vary. However, a curved surface is easier to clean. Hence, preferred shapes for such chambers and passages in cross section are oval or circular (the chambers and passages being often cylindrical).

The particular model shown is modular so that the dispenser can be dismantled for easy cleaning, with the passage and food collector being easily detachable. The opening of the feeding chamber may have a collar (FIG. 5, 30) extending therefrom which fits snuggly around the wall of the entrance tube or passage. This allows for disassembling the entrance passage from the food-containing chamber for easy cleaning.

The size and length of the feeding passage should be at least ½ the length of the body of the animal to be fed.

Figure 2:
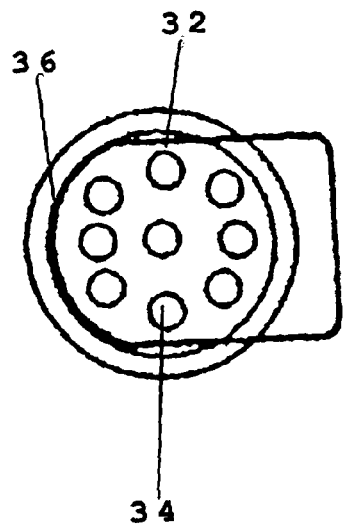
FIG. 2 shows the residue release plate.

FIG. 2 shows the residue release plate (32), which acts as a floor to the feeding chamber when fitted into the slot of the food chamber (shown in cross section) having circular openings (34) which allow spillage during feeding to fall into the catchment chamber. The plate (32) is pushed into the feeding chambers at slit (13) (FIG. 5). The openings in the plate may be of any shape. However, it is usually easier to clean surfaces with rounded openings. The rounded edge of the plate (36) fits snuggly against the wall of the feeding chamber.

Figure 3:
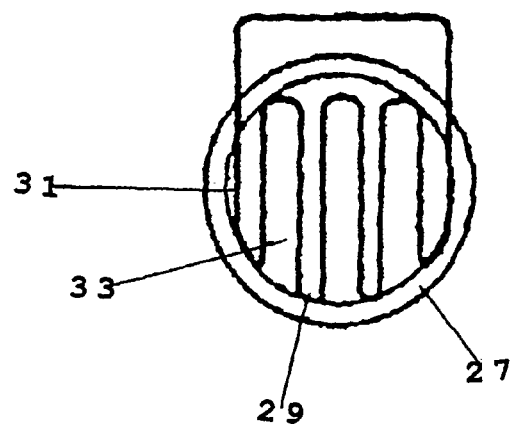
FIG. 3 shows the food retainer plate

FIG. 3 shows the release plate (31) through which food is dispensed into the feeding chamber. While elongated finger-like openings (33) in the plate are preferred, other shapes may be used. The plate (31) is pushed through a slit (12) (FIG. 5) so that the rounded edge (29) is against the wall of the chamber (27) near the slit which provides for entrance of the release plate.

Figure 4:
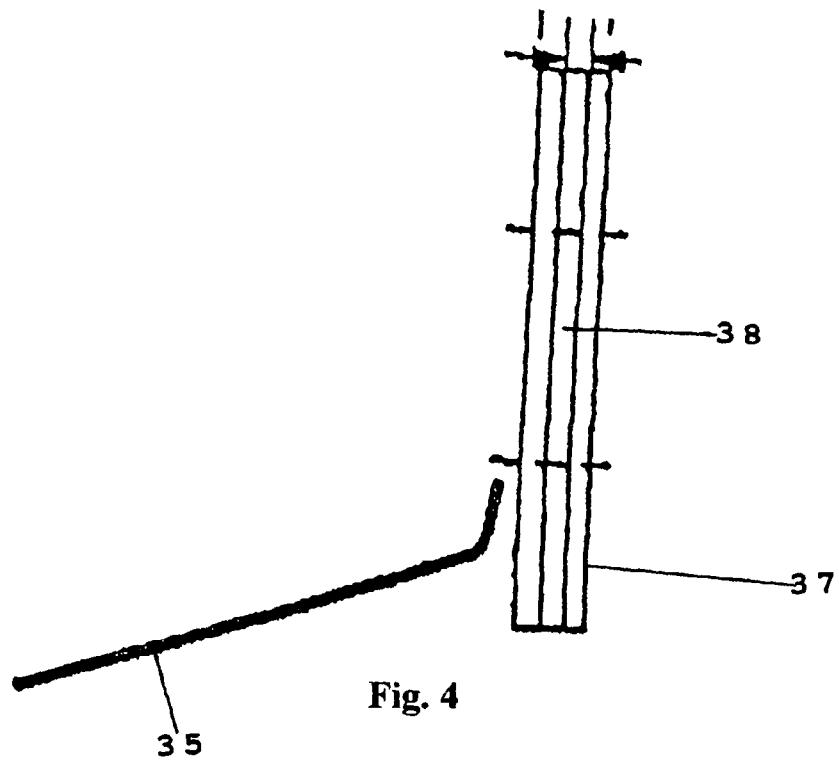
FIG. 4 shows the ramp which the animal must traverse in reaching food supply and the collar which acts as an attachment means to the cage and which supports the upper portion of the ramp.

Referring to FIG. 4, the ramp, (35) is shown attached to a collar (37) which has grooves (38) on each side while fit into the wall of the cage as means for attachment of the feeder to the cage.

The materials used can be substituted with other materials used in the art such as other plastics, metal and even wood. However, clear plastics or glass are particularly useful, since they allow for observation of the animals during feeding. The device can be used for research in behavior, physiology, nutrition, metabolism and other studies. The food may be treated with various active agents such as medicinals, vitamins or hormones. The devices of the invention are spill-proof and can be reasonably priced.

What we claim is:

1. A feed dispenser for rodents comprising a feeding chamber reached by an ascending ramp, an entry tube having a first opening end and a second opening end, said ramp leading and connecting to only at said first opening end of said entry tube and said second opening end of said entry tube lending and connecting to said feeding chamber, said feeding chamber having a first slit in the sidewall of said feeding chamber where a first grid is inserted therethrough to separate said feeding chamber from a food holding chamber above said feeding chamber, said first grid is sized to allow an animal to access food pellets in said food holding chamber from said feeding chamber but to prevent said animal from removing said food pellets from said food holding chamber to a nesting area, the floor of said feeding chamber consists of a second grid that is inserted through a second slit in the sidewall of said feeding chamber, and said second grid allows food residues to fall from said feeding chamber into a catchment chamber, wherein said catchment chamber is separated from said food holding chamber by said feeding chamber.

2. The feed dispenser of claim 1, wherein the angle between the under side of said ascending ramp is related to an imaginary vertical line through said entry tube that is essentially perpendicular with the floor of said entry tube is about 30 to 60 degrees.

3. The feed dispenser of claim 1 wherein the food dispenser is attached to a cage.

4. The feed dispenser of claim 3 wherein the means of attaching to said cage is a collar.

5. The feed dispenser of claim 1 wherein the ramp is an integral part of the entry tube.

6. The feed dispenser of claim 3 wherein the means of attaching said dispenser to said cage is a clip, screw or clamp.

7. The feed dispenser of claim 1 wherein the grids are made of aluminum.

8. The feed dispenser of claim 1 wherein the entry tube and feeding chamber walls are constructed of polyvinyl chloride.

9. The feed dispenser of claim 1, wherein the feeding chamber has a vertical rise from the ramp that requires an animal to jump or rise on its hind legs in order to enter the feeding chamber.

* * * * *

UNITED STATES PATENT AND TRADEMARK OFFICE
CERTIFICATE OF CORRECTION

PATENT NO. : 7,748,346 B2 Page 1 of 1
APPLICATION NO. : 11/197449
DATED : July 6, 2010
INVENTOR(S) : Jacqueline Hibbert et al.

It is certified that error appears in the above-identified patent and that said Letters Patent is hereby corrected as shown below:

Column 2, line 39: after "grid" please delete "6" and insert --(6)--;

Column 3, line 17: please delete "(1) (2)" and insert --(12)--.

Signed and Sealed this

Fourteenth Day of September, 2010

David J. Kappos
*Director of the United States Patent and Trademark Office*